US012647140B2

(12) United States Patent
Sittler et al.

(10) Patent No.: US 12,647,140 B2
(45) Date of Patent: Jun. 2, 2026

(54) METHOD FOR DEMODULATING A RF SIGNAL

(71) Applicant: STMicroelectronics (Grand Ouest) SAS, Le Mans (FR)

(72) Inventors: Francois Sittler, Thorigne-Fouillard (FR); Patrick Guyard, Noyal sur Vilaine (FR)

(73) Assignee: STMICROELECTRONICS (GRAND OUEST) SAS, Le Mans (FR)

( * ) Notice: Subject to any disclaimer, the term of this patent is extended or adjusted under 35 U.S.C. 154(b) by 319 days.

(21) Appl. No.: 18/392,372

(22) Filed: Dec. 21, 2023

(65) Prior Publication Data

US 2024/0214010 A1     Jun. 27, 2024

(30) Foreign Application Priority Data

Dec. 22, 2022     (EP) .................................... 22306990

(51) Int. Cl.
H04B 1/00          (2006.01)
H04B 1/16          (2006.01)
(52) U.S. Cl.
CPC ......... H04B 1/0096 (2013.01); H04B 1/0014 (2013.01); H04B 1/1607 (2013.01)
(58) Field of Classification Search
CPC .. H04B 1/0096; H04B 1/0014; H04B 1/1607; H04B 1/109; H04B 1/30
See application file for complete search history.

(56) References Cited

U.S. PATENT DOCUMENTS

| | | | | |
|---|---|---|---|---|
| 7,068,987 | B2 * | 6/2006 | Baldwin | ............... H04L 25/061 |
| | | | | 455/343.2 |
| 12,237,873 | B2 * | 2/2025 | Cella | .................. G05B 19/4185 |
| 2005/0243220 | A1 * | 11/2005 | Yun | ........................ H03D 3/008 |
| | | | | 348/730 |
| 2006/0270375 | A1 | 11/2006 | Beamish et al. | |
| 2009/0135035 | A1 * | 5/2009 | Fifield | .................. H04B 1/1027 |
| | | | | 341/143 |
| 2011/0217918 | A1 | 9/2011 | Rechberger et al. | |
| 2018/0287644 | A1 * | 10/2018 | Burykh | .................... H04B 1/16 |

FOREIGN PATENT DOCUMENTS

WO          02091104 A3     11/2002

* cited by examiner

*Primary Examiner* — Fayyaz Alam
(74) *Attorney, Agent, or Firm* — SLATER MATSIL, LLP

(57) ABSTRACT

The present disclosure relates to a method for demodulating a RF signal comprising the steps of: detecting if an analog to digital converter (ADC) of a Near Zero Intermediate Frequency (NZIF) receiver is in a clipping state; and if yes: determining and storing a first value (RSSI1) representative of the energy of a received signal demodulated by the Near Zero Intermediate Frequency (NZIF) receiver using a first intermediate frequency (IF1); determining and storing a second value (RSSI2) representative of the energy of the received signal demodulated by the Near Zero Intermediate Frequency (NZIF) receiver using a second intermediate frequency (IF2) corresponding to the opposite value of the first intermediate frequency (IF1), selecting the intermediate frequency corresponding to the lowest value of said first and second values.

24 Claims, 6 Drawing Sheets

A1)

ADJACENT CHANNEL, 310

NBIOT signal

IF1

Baseband filter, 117, 126

LO    Frx

WIDEBAND RSSI

B1)

IMAGE REJECTION

IMAGE, 320

O derotation

C1)

DIGITAL CHANNEL FILTER, 160, 162

O

ADJACENT CHANNEL, 310

Baseband filter, 117, 126

A1')

IF2=-IF1

NBIOT signal

Frx LO

WIDEBAND RSSI

B1')

IMAGE, 420

O derotation

C1')

DIGITAL CHANNEL FILTER, 160, 162

IMAGE, 420

O

A2)

B2)

C2)

A2')

B2')

C2')

METHOD FOR DEMODULATING A RF SIGNAL

CROSS-REFERENCE TO RELATED APPLICATIONS

This application claims the priority benefit of European patent application number EP22306990, filed on Dec. 22, 2022, entitled "Method for demodulating a RF signal," which is hereby incorporated by reference to the maximum extent allowable by law.

TECHNICAL FIELD

The present disclosure relates generally to methods for demodulating RF signals and to RF circuits to implement such methods.

BACKGROUND

Radio frequency (RF) receivers can be split in two main categories: those based on a Zero Intermediate Frequency architecture (ZIF) and those based on the Near Zero Intermediate frequency (NZIF) architecture.

An NZIF receiver converts a received radio signal to an intermediate frequency whose carrier frequency is in the order of magnitude of the baseband signal bandwidth but is significantly lower than the radio carrier frequency to be demodulated.

NZIF receivers are subject to misfunctioning in the presence of blockers or adjacent channels in the vicinity of the received signal frequency and with strong intensities as compared to the signal of interest.

SUMMARY

There is a need to provide a method for demodulating the RF received signals which allow a correct behavior of the receiver in the presence of blockers or adjacent channels.

One or more embodiments address all or some of the drawbacks of known methods for demodulating RF received signals.

One or more embodiments provide a method for demodulating a RF signal comprising the steps of: detecting if an analog to digital converter of a Near Zero Intermediate Frequency receiver is in a clipping state; and, if yes: determining and storing a first value representative of the energy of a received signal demodulated by the Near Zero Intermediate Frequency receiver using a first intermediate frequency; determining and storing a second value representative of the energy of the received signal demodulated by the Near Zero Intermediate Frequency receiver using a second intermediate frequency corresponding to the opposite value of the first intermediate frequency, and selecting the intermediate frequency corresponding to the lowest value of said first and second values.

An embodiment provides an RF circuit configured to: detect if an analog to digital converter of a Near Zero Intermediate Frequency receiver is in a clipping state; and if yes: determining and storing a first value representative of the energy of a received signal demodulated by the Near Zero Intermediate Frequency receiver using a first intermediate frequency; determining and storing a second value representative of the energy of the received signal demodulated by the Near Zero Intermediate Frequency receiver using a second intermediate frequency corresponding to the opposite value of the first intermediate frequency, selecting the intermediate frequency corresponding to the lowest value of said first and second values.

According to an embodiment, the selected intermediate frequency is further used by the Near Zero Intermediate Frequency receiver for demodulating a next frame of the received signal.

According to an embodiment, if the analog to digital converter of the Near Zero Intermediate Frequency receiver is not in a clipping state, the current intermediate frequency is kept.

According to an embodiment, the clipping state is detected when a given number of samples of the analog to digital converter are equal to maximum or minimum values of the analog to digital converter.

According to an embodiment, the clipping state detection is performed for each frame of the received signal.

According to an embodiment, the clipping state detection is performed at the end of each frame.

According to an embodiment, the first and second energy indications are wide-band received signal strength indications.

According to an embodiment, the method or the circuit comprises filtering the received signal with an analog low-pass filter and the bandwidth of the wide-band received signal strength indications is defined by the bandwidth of the analog low-pass filter.

According to an embodiment, the method or the circuit comprises amplifying the RF signal and splitting the amplified signal into a first and a second path.

According to an embodiment, the method or the circuit comprises: mixing the amplified RF signal, in the first path, with an in-phase signal of a local oscillator frequency corresponding to the sum of a central frequency of the received signal and of the selected intermediate frequency, and mixing the amplified RF signal, in the second path, with a quadrature signal of said local oscillator frequency.

According to an embodiment, said analog low-pass filter bandwidth is centered on the local oscillator frequency.

According to an embodiment, the method or the circuit comprises: filtering high frequencies of the mixed signals of the first and second paths; amplifying the filtered signals; and converting the amplified filtered signals into digital signals with the analog to digital converter.

According to an embodiment, the method or the circuit comprises mixing the digitalized signals with a third signal having the selected intermediate frequency.

According to an embodiment, the first and second energy indications correspond to the square root of the sum of square of first path signal and square of quadrature path signal.

According to an embodiment, the first and second energy indications are determined after the analog to digital conversion by said analog to digital converter and before the digital mixing.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following, n one or more embodiments, methods and NZIF based circuits are implemented to detect if the presence of normalized blockers or adjacent channels induces an unwanted signal in a RF NZIF based circuit receiver. In one or more embodiments, in the case where the presence of an unwanted signal is detected, the intermediate frequency is adapted as function of a channel energy indication to get rid of the unwanted signal.

Figure 1:
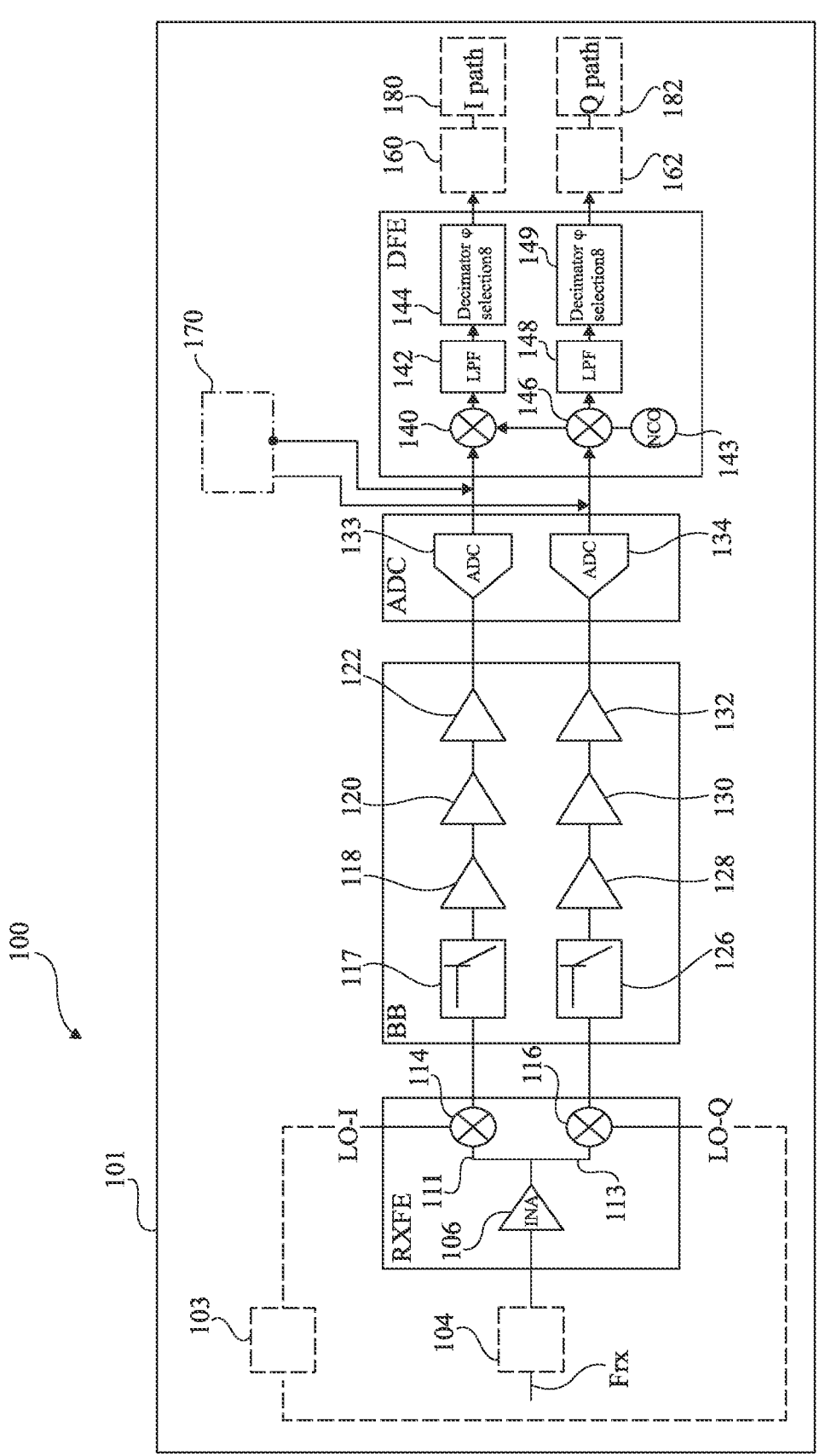
FIG. 1 illustrates an embodiment of a RF circuit.

FIG. 1 illustrates an embodiment of a RF circuit 100. More precisely, FIG. 1 illustrates an RF transceiver architecture.

The RF circuit 100 comprises for example a NZIF receiver 101.

In the represented example, the NZIF receiver 101 comprises a first module RXFE (Receive Front-End) coupled, or preferably connected, to a second module BB (Base Band). In one or more embodiments, the second module BB is coupled, or preferably connected, to a third module ADC (Analog Digital Converter), which is coupled, or preferably connected, to a fourth module DFE (Digital Front End).

In one or more embodiments, the represented NZIF receiver comprises an analog RF filter 104 which is for example a band-pass filter configured to filter the received signal having a frequency band with a central frequency Frx.

In one or more embodiments, the first module RXFE comprises an amplifier 106, for example a low noise amplifier LNA (Low Noise Amplifier), configured to amplify the received RF signal filtered by the analog RF filter 104. In one or more embodiments, the amplified signal is then split into two different paths 111, 113. In one or more embodiments, the first module comprises one mixer 114, 116 per path. In one or more embodiments, each of the mixers 114, 116 is configured to mix the received RF signal Frx of the corresponding path with a signal having a local oscillator frequency LO. In the disclosed embodiments, the frequency LO corresponds to the sum of the central frequency Frx of the received signal and of an intermediate frequency, IF1 or IF2, determined as function of a value RSSI1 or RSSI2 representative of the energy of the received signal demodulated by the Near Zero Intermediate Frequency (NZIF) receiver 101. In one or more embodiments, the local oscillator frequency LO of path 111 corresponds to an in-phase signal LO-I and the local oscillator frequency LO of path 113 corresponds to a quadrature signal LO-Q. In one or more embodiments, the in-phase LO-I and quadrature LO-Q signals are respectively real and imaginary parts of a signal with the frequency LO and supplied by a local oscillator 103.

In one or more embodiments, a frequency down-conversion is implemented by the mixers 114 and 116 respectively. In one or more embodiments, the mixed signals frequency at the output of the mixers 114 and 116, respectively in phase and in quadrature, can take two discrete values IF1 or IF2.

In one or more embodiments, the mixed signals at the output of the mixers 114, 116 are respectively coupled, or preferably connected, to a low-pass analog baseband filter 117, 126 of the second module BB which is configured to filter out frequencies superior to, for example, two or three times the intermediate frequency, for example, 1.5 MHz for an intermediate frequency of 480 kHz. In one or more embodiments, when transposed to RF, the low-pass filter 117, 126 is equivalent to a band-pass filter centered on the local oscillator frequency LO. In other words, in one or more embodiments, the signals outside of frequency band LO±baseband BB bandwidth are rejected by filters 117, 126.

In one or more embodiments, the outputs of the filters 117, 126 are respectively, coupled, or preferably connected, to a different series of amplifiers (118, 120, 122 for the first path 111, and 128, 130, 132 for the second path 113), which are for example programmable gain amplifiers of the second module BB. The number of amplifiers may depend on the application.

In one or more embodiments, the output of the amplifiers 122 and 132 are respectively coupled, or preferably connected, to different analog to digital converters (ADC) 133, 134 of the third module to convert the filtered and amplified signals of the second module into digital signals.

In one or more embodiments, the fourth module DFE comprises optional direct current (DC) offset removal circuits, which are not represented, coupling the output of the analog to digital converters 133 to a mixer 140 for the first path 111 and the analog to digital converter 134 to another mixer 146 for the second path 113. In one or more embodiments, DC offset removal circuits are configured to remove unwanted DC bias which may originate from the received signal Frx or from the ADC circuits to improve system performance degradation and bit error rate.

In the represented example, an oscillator 143 (NCO) of the fourth module DFE, which is for example a numerically controlled oscillator, supplies a signal NCO_IF having the determined intermediate frequency IF1 or IF2 to the mixers 140, 146.

In one or more embodiments, a derotation is implemented by mixers 140, 146 for the signals of first and second paths respectively.

In one or more embodiments, a low pass filter 142 (LPF) of the first path couples the output of the mixer 140 to a first decimator 144 (Decimator φ selection8) and another low pass filter 148 (LPF) of the second path couples the output of the mixer 146 to a second decimator 149 (Decimator φ selection8). In one or more embodiments, the decimator is configured to reduce the data rate by removing samples from the data stream without impacting the signal. In the represented example, the decimators are configured to decimate-by-eight. Other configurations are possible, for example, decimate-by-two. Decimate-by-two function is equivalent to a data converter clocked at half the original rate, with an analog anti-aliasing filter at half the original Nyquist bandwidth. In one or more embodiments, the decimation filter by eliminates unwanted signal images. In one or more embodiments, it also eliminates half of the noise power. In one or more embodiments, because the desired signal remains unchanged and the noise power reduces by half, there is an overall signal-to-noise ratio (SNR) improvement. In one or more embodiments, for any arbitrary decimation factor D, SNR improves by 10*log(D).

In one or more embodiments, the outputs of the decimators 144 and 149 are respectively coupled, or preferably connected, to digital channel filters 160, 162 which are for example band-pass filters with a bandwidth slightly larger than the frequency band bandwidth of the received signal. In a non-illustrated example, the digital channel filters 160, 162 couple the low path filters 142, 148 to the respective decimators 144, 149.

In one or more embodiments, the outputs of the digital analog filters 160, 162 are coupled, or preferably connected, to digital signal processor (DSP) inputs 180 (I path) and 182 (Q path) to analyze the demodulated received signal. In a non-illustrated example, the digital signal processor (DSP) inputs 180 (I path) and 182 (Q path) couple the digital channel filters 160, 162 to the respective decimators 144, 149.

In one or more embodiments, a computing circuit 170 of the RF circuit 100 is, for example, coupled, or preferably connected, to the outputs of the analog to digital converters 133 and 134.

In one or more embodiments, the computing circuit 170 is configured to detect if the analog to digital converter 133, 134 of at least one of the paths 111, 113 is in a clipping state.

In one or more embodiments, the computing circuit 170 is, for example, also configured to determine and store a value RSSI1, RSSI2 representative of the energy of the received signal after demodulation or partial demodulation. In one or more embodiments, the value RSSI1 is representative of the energy of the received signal when a first intermediate frequency IF1 is used for the demodulation by the NZIF receiver and the value RSSI2 is representative of the energy of the received signal when a second intermediate frequency IF2 is used.

In one or more embodiments, the first and second energy indications RSSI1, RSSI2 are, for example, received signal strength indications (RSSI), for example wide-band received signal strength indications. In other words, in one or more embodiments, the first and second energy indications RSSI1, RSSI2 correspond for example to the RSSI within the bandwidth of the low-pass analog filter 117, 126.

In another example, the first and second energy indications RSSI1, RSSI2 correspond to the square root of the sum of square of first path signal and square of quadrature path signal.

In one or more embodiments, the computing circuit 170 is configured to adapt the intermediate frequency of the NZIF receiver 101 as a function of the clipping state of the ADC circuits 133 and/or 134, and as a function of the received signal strength indication RSSI1, RSSI2.

Figure 2:
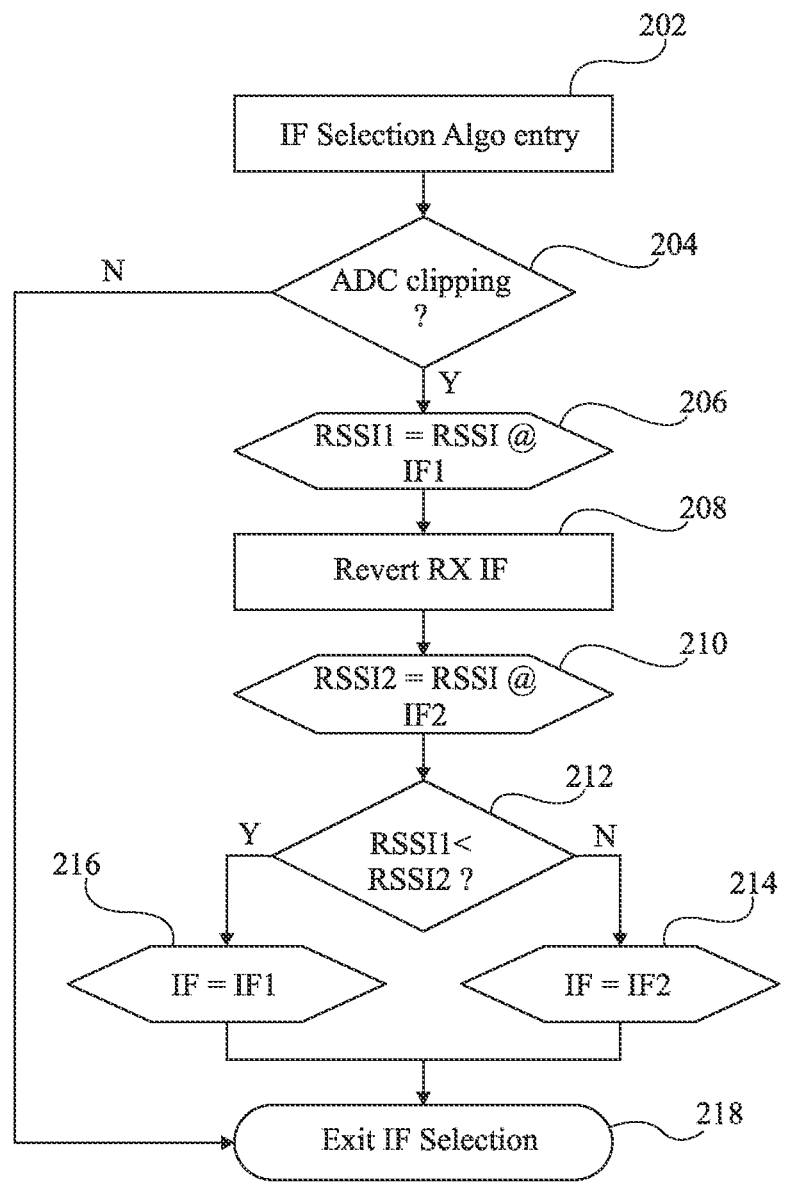
FIG. 2 illustrates an embodiment of a RF signal demodulation method.

FIG. 2 illustrates an embodiment of a RF signal demodulation method. In an example, the demodulation method can be implemented by the RF circuit of FIG. 1.

More particularly, FIG. 2 illustrates steps of a method for selecting the intermediate frequency IF to be used for the demodulation.

In a step 202 (IF Selection Algo entry), the demodulation method begins.

In a following step 204 (ADC clipping?), a clipping state of an analog to digital converter ADC of a NZIF receiver is investigated, for example, by the computing circuit 170. In one or more embodiments, the clipping state is, for example, detected when a given number of samples of the analog to digital 133, 134 are equal to maximum or minimum values of the analog to digital converter. In an example of an 8-bit ADC, the minimum value is −128 and the maximum value is +127. In one or more embodiments, the clipping state detection is performed for example for each frame of the received signal and/or at the end of each frame.

In one or more embodiments, if the ADC is not in a clipping state (output N of bloc 204), the intermediate frequency is not modified and stays as for the previous frame. In one or more embodiments, the selection method of the intermediate frequency ended (step 218—Exit IF selection).

In one or more embodiments, if the ADC is in a clipping state (output Y of bloc 204), a step 206 (RSSI1=RSSI@IF1) is performed. In step 206, a first value RSSI1 representative of the energy of a received signal demodulated by the NZIF receiver using the first intermediate frequency IF1 is determined and stored. In one or more embodiments, the value IF1 is, for example, the current intermediate frequency of the NZIF receiver. In an example of application to narrow band internet of things (NBIOT), the value IF1 is for example set to 480 kHz. In one or more embodiments, step 206 is for example performed by the computing circuit 170.

In a following step 208 (Revert RX IF), the intermediate frequency is inverted. In other words, for example, an intermediate frequency IF2 is set to the opposite value of IF1 (for example −480 kHz).

In a following step 210 (RSSI2=RSSI@IF2), a second value RSSI2 representative of the energy of a received signal demodulated by the NZIF receiver using the opposite intermediate frequency IF2 is determined and stored. Step 210 is, for example, performed by the computing circuit 170.

In a following step 212 (RSSI1<RSSI2?), the first value RSSI1 and the second value RSSI2 are compared. In one or more embodiments, if the first value RSSI1 is lower than the second value (branch Y) then a step 216 (IF=IF1) is performed. In one or more embodiments, if the first value RSSI1 is superior to the second value (branch N) then a step 214 (IF=IF2) is performed.

In step 214, the intermediate frequency is set to the second intermediate frequency IF2.

In step 216, the intermediate frequency is set to the first intermediate frequency IF1.

After step 214 or 216, the selection method ends by step 218.

The method of FIG. 2 allows, as an example, the selection of an intermediate frequency value, which may lower the wide-band energy of the channel, reflecting the fact that an unwanted signal is not overlaid to the signal of interest.

Figure 3:
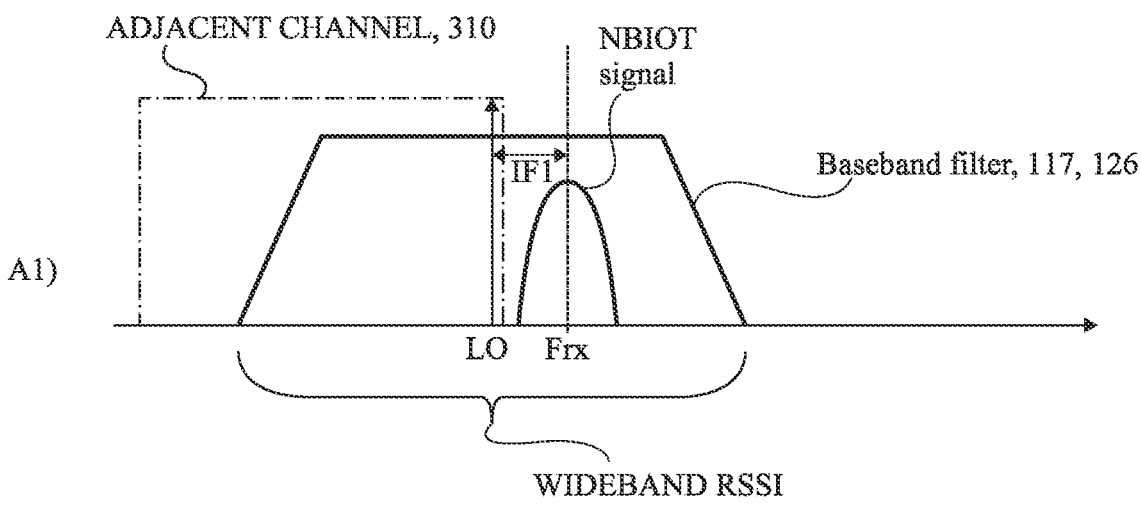
FIG. 3 illustrates steps of the method of FIG. 2 in the presence of an adjacent channel.
Figure 3:
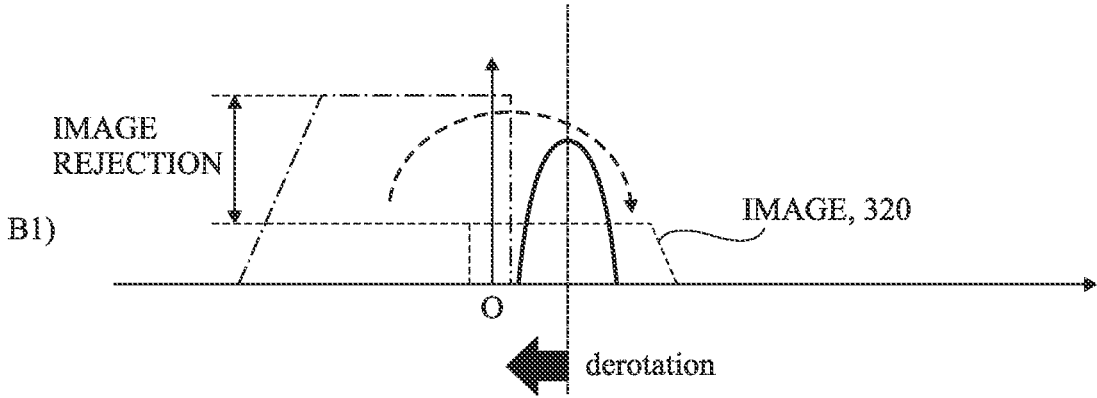
Figure 3:
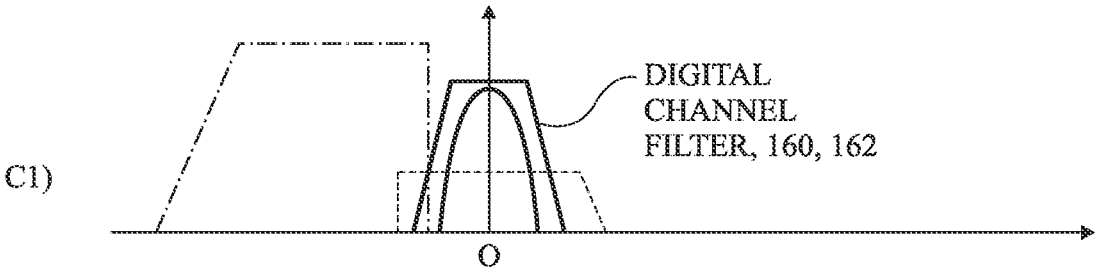

FIG. 3 illustrates steps of the method of FIG. 2 in the presence of an adjacent channel. FIG. 3 uses an example of an NBIOT signal. However, the method can be applied to other signal frequencies. More specifically, in one or more embodiments, the steps of FIG. 3 illustrate the case where an adjacent channel 310 (ADJACENT CHANNEL) is present with frequencies that crosses the local oscillator frequency LO and lead to the case where the ADC is in a clipping state and where RSSI1 is superior to RSSI2.

In a step A1), the intermediate frequency IF1 is set and a first analog down-conversion is applied to the received signal by mixing the received signal and a signal having the local oscillator frequency LO. In one or more embodiments, the frequency LO is set to be equal to the addition of the intermediate frequency IF1 with the received signal central frequency Frx. In the example of FIG. 3, the adjacent channel 310 is on the opposite side of the wanted signal compared to the local oscillator frequency LO. In one or more embodiments, at the end of step A1), the central frequency of the signal is shifted from the frequency LO by the intermediate frequency IF1.

In a step B1), the signal obtained at the end of step A1) is digitally processed for a derotation with the intermediate frequency IF1 to down convert the signal to baseband. In one or more embodiments, during step B1), the filtered part of the adjacent channel 310 undergo an image rejection but an image 320 of the filtered adjacent channel is still present and form a frequency band which extends across the frequency LO and the channel bandwidth.

In one or more embodiments, the resulting down converted signal is filtered by the digital channel filters 160 and 162 (DIGITAL CHANNEL FILTER) represented in C1). In one or more embodiments, the digital channel filters 160 and 162 have a bandwidth centered on baseband and extending slightly on both sides of the demodulated signal. Step 206 is, for example, performed during step C1) to determine RSSI1.

In one or more embodiments, a part of the image 320 is still present inside the bandwidth of the digital channel filter and may lead to additional energy in the channel and ADC clipping.

Figure 4:
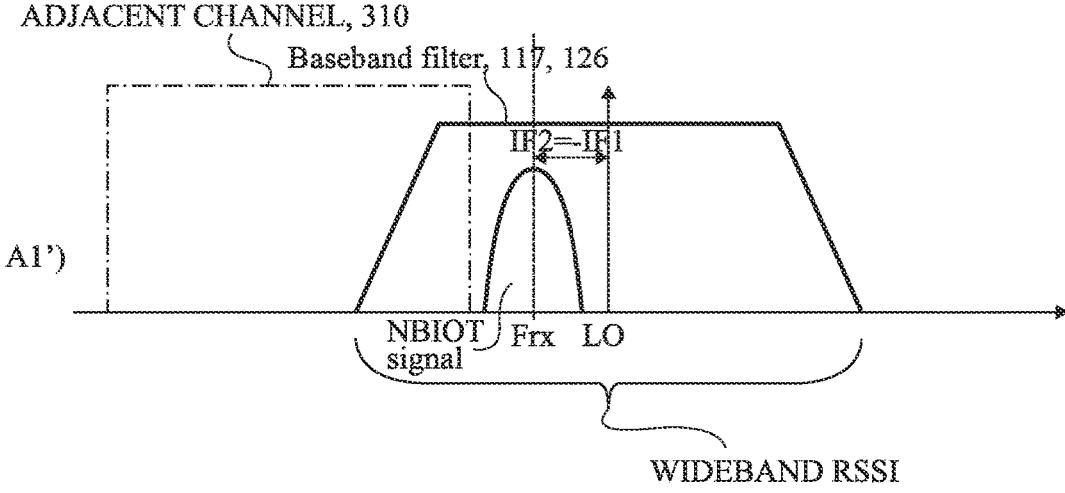
FIG. 4 illustrates steps of the method of FIG. 2 in the presence of an adjacent channel.
Figure 4:
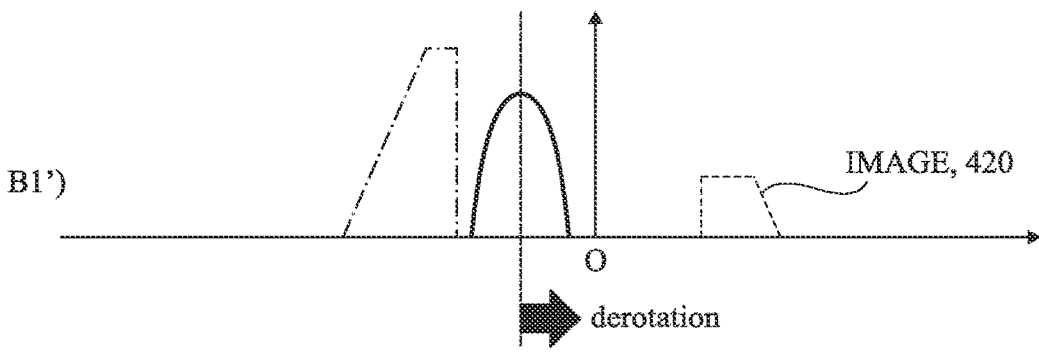
Figure 4:
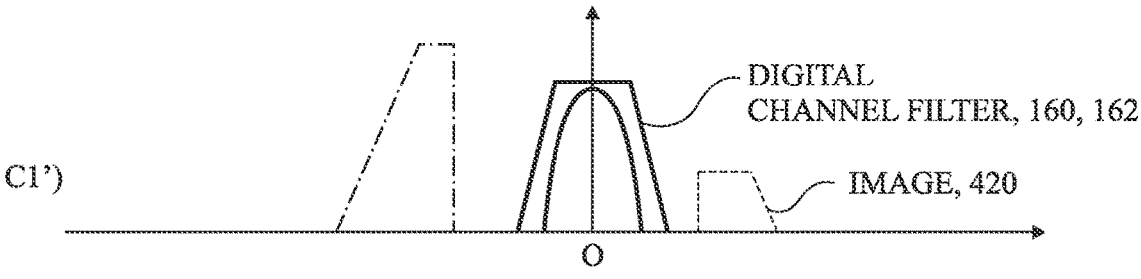

FIG. 4 illustrates steps of the method of FIG. 2 in the presence of an adjacent channel 310. In one or more embodiments, the adjacent channel 310 is similar to the adjacent channel of FIG. 3. More precisely, In one or more embodiments, FIG. 4 represents steps 208 and 210 of FIG. 2.

In a step A'1), a first analog down-conversion is applied to the received signal by mixing the received signal and a signal having the local oscillator frequency LO. In one or more embodiments, the frequency LO is set to be equal to the addition of the inverted intermediate frequency IF2 with the received signal central frequency Frx. In one or more embodiments, because IF2 is the opposite of IF1, compared to the example of FIG. 3, the adjacent channel is now on the same side of the LO as the wanted signal. At the end of step A1'), the central frequency of the signal is shifted from the frequency LO by the intermediate frequency IF2. In one or more embodiments, the received signal is then filtered by the analog low-pass filters 117, 126 (Baseband filter). In the represented example, the bandwidth of the analog filters is two or three times greater than the intermediate frequency and defines the wideband RSSI measurement bandwidth (WIDEBAND RSSI). In one or more embodiments, the adjacent channel part that remains unfiltered by the analog filters 117, 126 is now outside the received signal.

In a step B'1), the signal obtained at the end of step A1') is digitally processed for another derotation with the inverted intermediate frequency IF2 to down convert the signal to baseband. In one or more embodiments, during step B1'), the filtered part of the adjacent channel 310 undergo an image rejection but an image 420 of the filtered adjacent channel is still present and form a frequency band which extends outside the channel bandwidth.

In one or more embodiments, the resulting down converted signal is filtered by the digital channel filters 160 and 162 (DIGITAL CHANNEL FILTER) represented in C1'). In one or more embodiments, the digital channel filters 160 and 162 have a bandwidth centered on baseband and extending slightly on both sides of the demodulated signal. Step 210 is, for example, performed during step C1') to determine RSSI2.

In one or more embodiments, the image 420 and the unfiltered part of the adjacent channel are out of the bandwidth of the digital channel filter. They do not add additional energy in the channel, as it can be measured by wideband RSSI, hence preventing ADC clipping.

Figure 5:
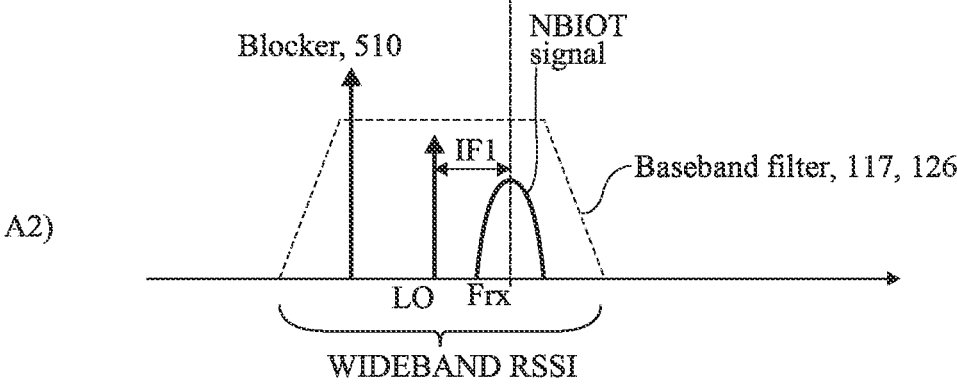
FIG. 5 illustrates steps of the method of FIG. 2 in the presence of a blocker.
Figure 5:
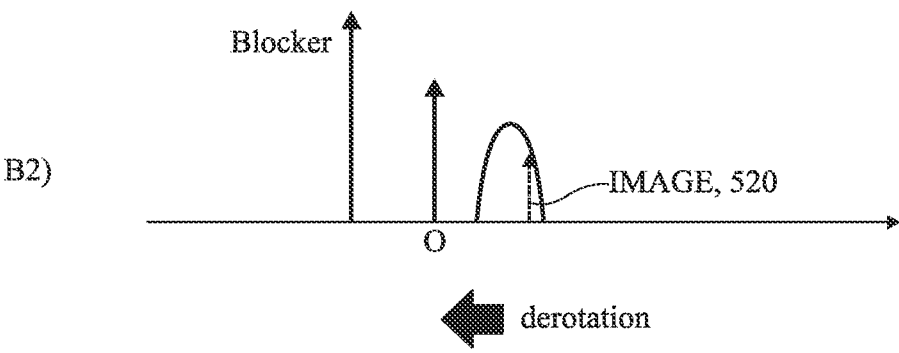
Figure 5:
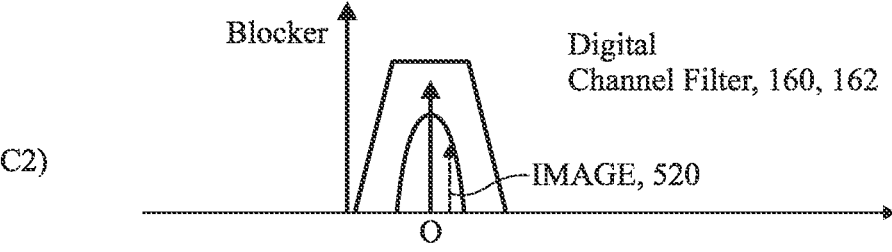

FIG. 5 illustrates steps of the method of FIG. 2 in the presence of a blocker. The example of FIG. 5 is similar to the example of FIG. 3 except that the adjacent channel is replaced by a blocker 510 (Blocker) having a frequency located inside the analog filter 104 bandwidth on the low frequency side.

In a step A2), the intermediate frequency IF1 is set and a first analog derotation is applied to the received signal by mixing the received signal and the signal having the local oscillator frequency LO. In one or more embodiments, the frequency LO is set to be equal to the addition of the intermediate frequency IF1 with the received signal central frequency Frx. In the example of FIG. 5, the blocker 510 is on the opposite side of the wanted signal compared to the local oscillator frequency LO. In one or more embodiments, at the end of step A2), the central frequency of the signal is shifted from the frequency LO by the intermediate frequency IF1. In one or more embodiments, the received signal is then filtered by the analog low-pass filters 117, 126 (Baseband filter). In the represented example, the bandwidth of the analog filters is two or three times greater than the intermediate frequency and defines the wideband RSSI measurement bandwidth (WIDEBAND RSSI).

In a step B2), the signal obtained at the end of step A2) is digitally processed for a derotation with the intermediate frequency IF1 to down convert the signal to baseband. In one or more embodiments, during step B2), the filtered part of the blocker 510 undergo an image rejection but an image 520 of the filtered blocker is still present and has an image frequency which falls inside the channel bandwidth.

In one or more embodiments, the resulting down converted signal is filtered by the digital channel filters 160 and 162 (DIGITAL CHANNEL FILTER) represented in C2) and even if the blocker frequency is filtered by the digital filter, a part of the image 520 is still present inside the bandwidth of the digital channel filter and may lead to additional energy in the channel and cause ADC clipping.

Step 206 is, for example, performed during step C2) to determine RSSI1.

Figure 6:
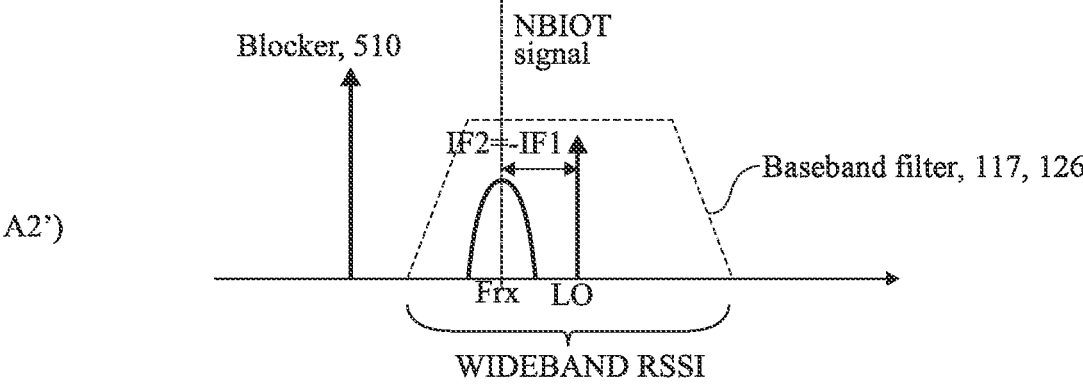
FIG. 6 illustrates steps of the method of FIG. 2 in the presence of a blocker.
Figure 6:
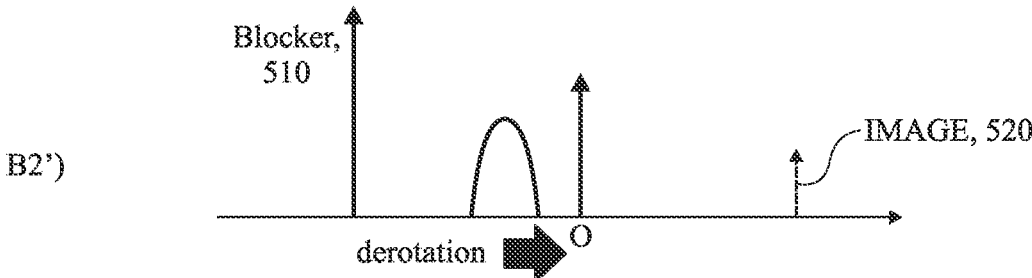
Figure 6:
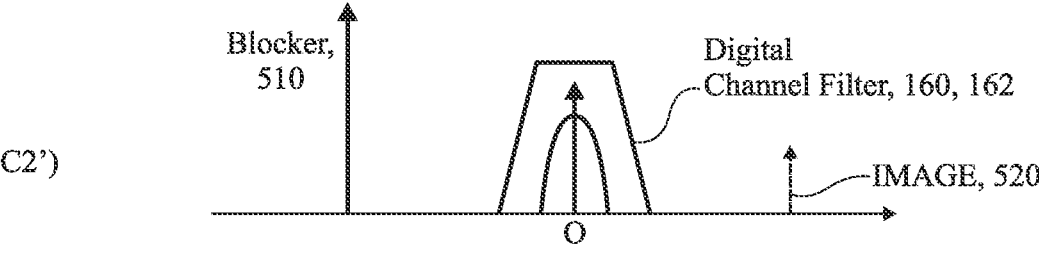

FIG. 6 illustrates steps of the method of FIG. 2 in the presence of a blocker 510.

In a step A2'), a first analog down-conversion is applied to the received signal by mixing the received signal and a signal having the local oscillator frequency LO. In one or more embodiments, the frequency LO is set to be equal to the addition of the inverted intermediate frequency IF2 with the received signal central frequency Frx. In one or more embodiments, because IF2 is the opposite of IF1, compared to the example of FIG. 3, the blocker signal is now on the same side of the LO as the wanted signal. In one or more embodiments, at the end of step A2'), the central frequency of the signal is shifted from the frequency LO by the intermediate frequency IF2. The received signal is then filtered by the analog low-pass filters 117,126 (Baseband filter). In the represented example, the bandwidth of the analog filters is 2 or 3 times greater than the intermediate frequency and defines the wideband RSSI measurement bandwidth (WIDEBAND RSSI). In one or more embodiments, the adjacent channel part that remains unfiltered by the analog filters 117, 126 is now outside the received signal.

In a step B'2), the signal obtained at the end of step A2') is digitally processed for a derotation with the inverted intermediate frequency IF2 to down convert the signal to baseband. In one or more embodiments, during step B2'), the filtered part of the blocker 520 undergo an image rejection but the image 520 of the filtered adjacent channel is present at a frequency which extends outside the channel bandwidth on the high frequency side.

In one or more embodiments, the resulting down converted signal is filtered by the digital channel filters 160 and 162 (DIGITAL CHANNEL FILTER) represented in C2'). In one or more embodiments, the digital channel filter 160, 162 has a bandwidth centered on baseband and extending slightly on both sides of the demodulated signal.

In one or more embodiments, the image 520 and the unfiltered part of the blocker 510 are out of the bandwidth of the digital channel filter. In one or more embodiments, they do not add additional energy in the channel, as it can be measured by wideband RSSI, hence preventing ADC clipping.

Step 210 is for example performed during step C2') to determine RSSI2.

FIGS. 3 to 6 show that, in one or more embodiments, by inverting the intermediate frequency, it is possible to prevent the effects of adjacent channels and/or blockers which can otherwise create ADC clipping (cases of FIGS. 3 and 5). In one or more embodiments, in relation with the method of FIG. 2, when the ADC is clipping, by inverting the intermediate frequency and comparing indications of the energy in the wideband channel RSSI1 and RRSI2 allows the ability to choose a configuration, which correspond to the case where the energy is the lowest in the wideband, which will in turn lead to prevention of ADC clipping.

Various embodiments and variants have been described. Those skilled in the art will understand that certain features of these embodiments can be combined and other variants will readily occur to those skilled in the art. In particular, even if the case of adjacent channels and blockers are present on the low frequency side have been illustrated in FIGS. 3 to 6, the inversed reasoning could be achieved for cases where adjacent channel and blocker are present initially on high frequency side. In one or more embodiments, in case of ADC clipping, inverting the intermediate frequency and selecting the lowest wideband channel energy configuration may provide a solution for preventing the ADC clipping and other adjacent channel/blocker effects.

Moreover, in one or more embodiments, even if the solution of inverting the intermediate frequency has been described, an intermediate frequency value close to the opposite value of the initial intermediate frequency value may also be used.

Finally, in one or more embodiments, the practical implementation of the embodiments and variants described herein is within the capabilities of those skilled in the art based on the functional description provided hereinabove. In particular, in one or more embodiments, the proposed methods and circuits may be used for different RF signal bands such as 4G, 5G, IoT or non-cellular RF standards BT, ZigBee or other industry standards.

What is claimed is:

1. A method for demodulating a radio frequency (RF) signal, the method comprising:
   detecting if an analog to digital converter (ADC) of a Near Zero Intermediate Frequency (NZIF) receiver is in a clipping state; and
   when the ADC is in the clipping state:
      determining and storing a first value representative of a first energy of a received signal demodulated by the NZIF receiver using a first intermediate frequency;
      determining and storing a second value representative of a second energy of the received signal demodulated by the NZIF receiver using a second intermediate frequency corresponding to an opposite value of the first intermediate frequency; and
      selecting, from the first intermediate frequency and the second intermediate frequency, an intermediate frequency corresponding to a lowest value of the first value and the second value.

2. The method according to claim 1, wherein the selected intermediate frequency is further used by the NZIF receiver for demodulating a next frame of the received signal.

3. The method according to claim 1, wherein, when the ADC of the NZIF receiver is not in the clipping state, a current intermediate frequency is kept.

4. The method according to claim 1, wherein the clipping state is detected when a particular number of samples of the ADC are equal to a maximum value or a minimum value of the ADC.

5. The method according to claim 1, wherein the detecting of the clipping state is performed for each frame of the received signal.

6. The method according to claim 5, wherein the detecting of the clipping state is performed at a respective end of each frame.

7. The method according to claim 1, wherein:
   the first value and the second value are wide-band received signal strength indications, and the method further comprises filtering the received signal with an analog low-pass filter, wherein a first bandwidth of the wide-band received signal strength indications is defined by a second bandwidth of the analog low-pass filter.

8. The method of claim 1, further comprising:
   amplifying the RF signal;
   splitting the amplified RF signal into a first path signal for a first path and a second path signal for a second path;
   mixing the first path signal with an in-phase signal of a local oscillator frequency corresponding to a first sum of a central frequency of the received signal and the selected intermediate frequency to obtain a first mixed signal; and
   mixing the second path signal with a quadrature signal of the local oscillator frequency to obtain a second mixed signal,
   wherein an analog low-pass filter bandwidth is centered on the local oscillator frequency.

9. The method of claim 8, further comprising:
   filtering high frequencies of the first mixed signal of the first path and the second mixed signal of the second path to obtain a first filtered signal corresponding to the first mixed signal and a second filtered signal corresponding to the second mixed signal;
   amplifying the first filtered signal and the second filtered signal to obtain a first amplified filtered signal corresponding to the first filtered signal and a second amplified filtered signal corresponding to the second filtered signal;

converting the first amplified filtered signal and the second amplified filtered signal into digital signals with the ADC; and mixing the digital signals with a third signal having the selected intermediate frequency.

10. The method according to claim 8, wherein:

the first value and the second value correspond to a square root of a second sum of a square of the first path signal and a square of the second path signal, and the first value and the second value are determined after an analog to digital conversion by the ADC and before the mixing of the digital signals.

11. An apparatus for demodulating a radio frequency (RF) signal, comprising:

an RF circuit configured to:

detect if an analog to digital converter (ADC) of a Near Zero Intermediate Frequency (NZIF) receiver is in a clipping state; and when the ADC is in the clipping state:

determine and store a first value representative of a first energy of a received signal demodulated by the NZIF receiver using a first intermediate frequency;

determine and store a second value representative of a second energy of the received signal demodulated by the NZIF receiver using a second intermediate frequency corresponding to an opposite value of the first intermediate frequency; and select, from the first intermediate frequency and the second intermediate frequency, an intermediate frequency corresponding to a lowest value of the first value and the second value.

12. The apparatus of claim 11, wherein the selected intermediate frequency is further used by the NZIF receiver for demodulating a next frame of the received signal.

13. The apparatus of claim 11, wherein, when the ADC of the NZIF receiver is not in the clipping state, a current intermediate frequency is kept.

14. The apparatus of claim 11, wherein the clipping state is detected when a particular number of samples of the ADC are equal to a maximum value or a minimum value of the ADC.

15. The apparatus of claim 11, wherein the detection of the clipping state is performed for each frame of the received signal.

16. The apparatus according to claim 15, wherein the detection of the clipping state is performed for each frame of the received signal.

17. The apparatus according to claim 11, wherein:

the first value and the second value are wide-band received signal strength indications, and the RF circuit is further configured to filter the received signal with an analog low-pass filter, wherein a first bandwidth of the wide-band received signal strength indications is defined by a second bandwidth of the analog low-pass filter.

18. An apparatus for demodulating a radio frequency (RF) signal, comprising:

an RF circuit configured to:

detect if an analog to digital converter (ADC) of a Near Zero Intermediate Frequency (NZIF) receiver is in a clipping state; and when the ADC is in the clipping state:

determine and store a first value representative of a first energy of a received signal demodulated by the NZIF receiver using a first intermediate frequency;

determine and store a second value representative of a second energy of the received signal demodulated by the NZIF receiver using a second intermediate frequency corresponding to an opposite value of the first intermediate frequency;

select, from the first intermediate frequency and the second intermediate frequency, an intermediate frequency corresponding to a lowest value of the first value and the second value;

amplify the RF signal; and split the amplified RF signal into a first path signal for a first path and a second path signal for a second path.

19. The apparatus of claim 18, wherein the RF circuit is further configured to:

mix the first path signal with an in-phase signal of a local oscillator frequency corresponding to a sum of a central frequency of the received signal and the selected intermediate frequency to obtain a first mixed signal; and mix the second path signal with a quadrature signal of the local oscillator frequency to obtain a second mixed signal.

20. The apparatus of claim 19, wherein an analog low-pass filter bandwidth is centered on the local oscillator frequency.

21. The apparatus of claim 20, wherein the RF circuit is further configured to:

filter high frequencies of the first mixed signal of the first path and the second mixed signal of the second path to obtain a first filtered signal corresponding to the first mixed signal and a second filtered signal corresponding to the second mixed signal;

amplify the first filtered signal and the second filtered signal to obtain a first amplified filtered signal corresponding to the first filtered signal and a second amplified filtered signal corresponding to the second filtered signal; and convert the first amplified filtered signal and the second amplified filtered signal into digital signals with the ADC.

22. The apparatus of claim 21, wherein the RF circuit is further configured to mix the digital signals with a third signal having the selected intermediate frequency.

23. The apparatus of claim 18, wherein the first value and the second value correspond to a square root of a sum of a square of the first path signal and a square of the second path signal.

24. The apparatus of claim 23, wherein the first value and the second value are determined after an analog to digital conversion by the ADC and before the mixing of the digital signals.

* * * * *